(12) United States Patent
Brozenick et al.

(10) Patent No.: US 7,063,811 B2
(45) Date of Patent: *Jun. 20, 2006

(54) METHOD OF PREPARING AN ARTICLE

(75) Inventors: Norman J. Brozenick, Cranberry Township, PA (US); Olaf Zoellner, Leverkusen (DE)

(73) Assignee: Bayer Materialscience LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/241,209

(22) Filed: Sep. 30, 2005

(65) Prior Publication Data

US 2006/0022381 A1    Feb. 2, 2006

Related U.S. Application Data

(63) Continuation of application No. 10/456,446, filed on Jun. 6, 2003.

(51) Int. Cl.
*B29C 51/10* (2006.01)
*B29C 51/12* (2006.01)
*B29C 51/14* (2006.01)

(52) U.S. Cl. .............. 264/510; 264/511; 264/544; 264/549; 264/267; 264/273; 264/274

(58) Field of Classification Search .............. 264/510, 264/511, 512, 513, 544, 549, 550, 553, 259, 264/263, 265, 266, 267, 273, 274
See application file for complete search history.

(56) References Cited

U.S. PATENT DOCUMENTS

| | | | | |
|---|---|---|---|---|
| 2,209,403 A | * | 7/1940 | Kittner et al. .............. 52/511 |
| 3,308,225 A | * | 3/1967 | Wells ........................ 264/249 |
| 3,358,550 A | * | 12/1967 | Crowther et al. ............ 411/34 |
| 3,458,618 A | * | 7/1969 | Burns et al. ................ 264/249 |
| 3,865,249 A | * | 2/1975 | Herzog ...................... 211/163 |
| 4,822,671 A | * | 4/1989 | Carper et al. ................ 428/33 |
| 5,190,803 A | | 3/1993 | Goldbach et al. ........... 428/138 |
| 5,252,164 A | | 10/1993 | Mills ......................... 156/212 |
| 5,494,542 A | | 2/1996 | Muller ........................ 156/66 |
| 5,839,847 A | | 11/1998 | Patel .......................... 403/269 |
| 6,093,358 A | * | 7/2000 | Schiewe et al. ............ 264/250 |
| 6,490,828 B1 | | 12/2002 | Volesky et al. ............. 52/36.1 |
| 6,517,649 B1 | | 2/2003 | Rugg et al. .................. 156/64 |

* cited by examiner

*Primary Examiner*—Angela Ortiz
(74) *Attorney, Agent, or Firm*—Joseph C. Gil

(57) ABSTRACT

The present invention is directed to a method of preparing an article of manufacture. The method includes bringing at least a portion of a heated thermoplastic sheet into contact with at least a portion of the first surface of a support having a plurality of perforations. A vacuum is formed on the second surface of the support, and portions the heated thermoplastic sheet are drawn through the perforations of the support and to the second surface side of the support. Thermoplastic attachment heads are formed on the second surface side of the support, from the thermoplastic material of the sheet that is drawn through the perforations. The thermoplastic sheet and the support are fixedly attached one to the other by means of the edges of the perforations being embedded in the thermoplastic material of the sheet drawn therethrough, and the thermoplastic attachment heads. Also disclosed are articles of manufacture, such as interior and exterior automotive body panels and components.

8 Claims, 7 Drawing Sheets

METHOD OF PREPARING AN ARTICLE

CROSS REFERENCE TO RELATED PATENT APPLICATION

The present patent application is a continuation of and claims priority under 35 U.S.C. § 120 of U.S. patent application Ser. No. 10/456,446, filed Jun. 6, 2003.

DESCRIPTION OF THE INVENTION

The present invention relates to a method of preparing an article. The method involves bringing the second surface of a heated thermoplastic film into contact with the first surface of a support having a plurality of perforations having edges. Reduced gaseous pressure is formed on the opposite second surface of the support, which serves to draw a portion of the heated thermoplastic film through at least some of the perforations. The thermoplastic material drawn through the perforations is formed into attachment heads on the second surface side of the support. The edges of the perforations become embedded in the thermoplastic material of the film drawn and extending therethrough, thereby fixedly attaching the thermoplastic film to the support. The present invention also relates to an article of manufacture.

Methods of preparing an article by means of vacuum forming a thermoplastic sheet over a substrate are generally known. Typically a thermoplastic sheet is brought into contact with a substrate, and a vacuum is drawn such that the thermoplastic sheet contacts and conforms to the shape of the substrate. Optionally, the thermoplastic sheet may be heated to improve its moldability prior to the vacuum forming step.

A disadvantage to such known vacuum forming processes is that they involve additional steps by which the thermoplastic sheet is fixedly attached to the substrate. Typically the thermoplastic sheet is fixed to the substrate by means of adhesives, which are generally applied to the surface of the substrate in a separate step prior to vacuum forming the thermoplastic sheet thereon. Alternatively, or in addition thereto, the thermoplastic sheet may be fixed to the substrate by means of fasteners, e.g., screws, bolts and/or rivets, in a separate step after the vacuum forming step.

Articles prepared by such vacuum forming processes can suffer from structural failures in which the thermoplastic sheet separates from the substrate. For example, in the case of internal and/or external body panels used in vehicles, such as automobiles and aircraft, cyclical loading (e.g., due to environmental temperature fluctuations) and vibrations can result in failure of the adhesives and/or fasteners, thus resulting in the thermoplastic sheet separating from the substrate. When the thermoplastic sheet is fixed to the substrate by means of fasteners, the resulting article can have degraded sealing properties relative to external and internal environments. The use of fasteners in effect results in the formation of a breach of both the thermoplastic sheet and the substrate, which can provide a pathway by which, for example, water, moisture and/or gasses may undesirably pass through from one side of the article to the other.

It would be desirable to develop new methods of preparing articles by means of vacuum forming that involve a reduced number of steps relative to fixing the thermoplastic sheet to the substrate. In addition, it would be desirable that such newly developed methods of manufacture result in the formation of articles that have improved physical properties, such as improved resistance to structural failure and improved sealing properties.

U.S. Pat. No. 5,494,542 discloses a vacuum forming method which involves laying a sheet of thermoplastic material (heated to a formable state) over a device having a locking configuration and at least one vacuum hole in the locking configuration. By means of a vacuum, the thermoplastic sheet is drawn down onto the surface of the device. The '542 patent also discloses drawing the heated thermoplastic sheet into the vacuum holes of the locking configuration.

U.S. Pat. No. 5,839,847 discloses a process in which a sheet of thermoplastic material heated to a formable state is placed adjacent to a fastener having an internal passage defining an air path from the base portion to the side surface portion thereof. In the method of the '847 patent, a vacuum is drawn such that the sheet partially flows into the passage to mechanically capture the fastener within the sheet.

In accordance with the present invention, there is provided a method of preparing an article comprising:
 (a) providing a sheet of thermoplastic material having a first surface and a second surface;
 (b) providing a support having a plurality of perforations having edges, a first surface and a second surface;
 (c) heating said thermoplastic sheet to a temperature that is equal to or greater than the softening point and less than the melting point of said thermoplastic sheet;
 (d) bringing at least a portion of the second surface of the heated thermoplastic sheet into contact with at least a portion of the first surface of said support;
 (e) forming (or providing) reduced gaseous pressure on the second surface of said support, thereby drawing portions of said heated thermoplastic sheet through at least some of said perforations, the edges of said perforations being embedded in the thermoplastic material drawn therethrough;
 (f) forming at least one thermoplastic attachment head on the second surface side of said support, said thermoplastic attachment head being formed from and being continuous with the portions of said thermoplastic sheet that are drawn through said perforations; and
 (g) cooling the heated thermoplastic sheet below its softening point, wherein said thermoplastic sheet is fixedly (and irreversibly) attached to said support by means of said attachment heads and the edges of said perforations being embedded in the thermoplastic material drawn therethrough.

In further accordance with the present invention, there is also provided an article of manufacture comprising:
 (a) a support having a plurality of perforations having edges, a first surface and a second surface; and
 (b) a sheet of thermoplastic material having a first surface and a second surface, at least a portion of the second surface of said thermoplastic sheet being in contact with at least a portion of the first surface of said support, wherein said thermoplastic sheet is fixedly (and irreversibly) attached to said support by means of a portion of said thermoplastic sheet extending through at least some of said perforations and being continuous with attachment heads on the second surface side of said support, and the edges of said perforations being embedded in the thermoplastic material extending there through.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings.

Unless otherwise indicated, all numbers or expressions, such as those expressing structural dimensions, process conditions, etc. used in the specification and claims are understood as modified in all instances by the term "about."

BRIEF DESCRIPTION OF THE DRAWINGS

In FIGS. 1 through 7, like reference numerals and characters designate the same components and structural features.

DETAILED DESCRIPTION OF THE INVENTION

Figure 1:
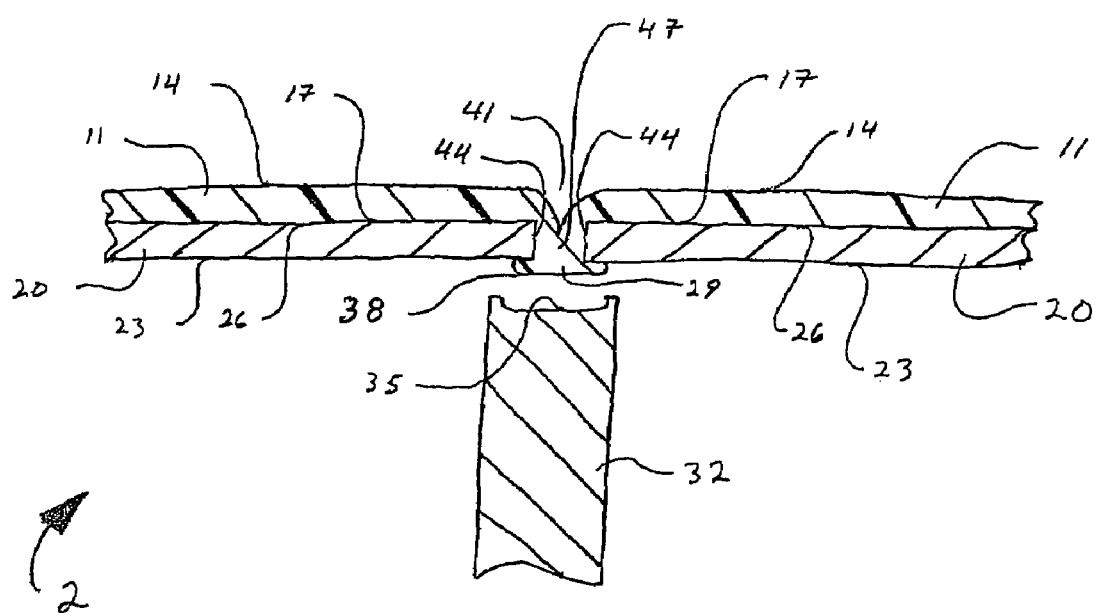
FIG. 1 is a representative sectional view of an article prepared by the process of the present invention.

The method of the present invention includes providing a thermoplastic sheet (a first thermoplastic sheet) fabricated from a thermoplastic material, having first and second surfaces. As used herein and in the claims, the term "thermoplastic" means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials from which the thermoplastic sheet may be fabricated include, but are not limited to thermoplastic polycarbonate, thermoplastic polyester, thermoplastic polyamide, thermoplastic graft copolymer (e.g., acrylonitrile-butadiene-styrene (ABS) graft copolymers, and ASA graft copolymers), thermoplastic vinyl polymer (e.g., ethylene-vinyl acetate (EVA) copolymers, acrylonitrile ethylene styrene (AES) copolymers, and styrene-acrylonitrile (SAN) copolymers), thermoplastic polyolefin (e.g., polyethylene, polypropylene, and ethylene-propylene copolymers), thermoplastic poly(meth)acrylate and thermoplastic polyurethane, and mixtures or thermoplastic compositions containing one or more thereof.

In an embodiment of the present invention, the thermoplastic sheet comprises at least one thermoplastic semicrystalline polymer. Thermoplastic semicrystalline polymers from which the thermoplastic sheet may be fabricated include, but are not limited to thermoplastic semicrystalline polyester, thermoplastic semicrystalline polyamide and mixtures or thermoplastic compositions containing one or more thereof.

As used herein and in the claims, the term "sheet" is inclusive of both sheets and films, e.g., sheets having a thickness of greater than or equal to 30 mils (762 μm), and films having a thickness of less than 30 mils (762 μm). The thermoplastic sheet may be selected from single layer sheets and multilayer sheets. Multilayer sheets that may be used in the method of the present invention may include layers fabricated from the same or different thermoplastic polymers and/or compositions, and include at least two (2) layers (e.g., from 2 to 8 layers and more typically 2, 3, 4 or 5 layers). Multilayer sheets may be made by art recognized methods, including, for example, coextrusion and lamination methods. An example of a multilayer sheet that may be used in the present invention has three (3) layers in the following sequence.

virgin polyamide|recycled polyamide|reinforced polyamide The reinforced polyamide layer of the multilayered sheet is typically brought into abutment with the support in the method of the present invention.

The thermoplastic sheet typically has a thickness of at least 10 mils (254 μm), preferably at least 60 mils (1524 μm), and more preferably at least 100 mils (2540 μm). The thermoplastic sheet typically has a thickness of less than or equal to 300 mils (7620 μm), preferably less than or equal to 250 mils (6350 μm), and more preferably less than or equal to 200 mils (5080 μm). The thermoplastic sheet may have a thickness ranging between any combination of these upper and lower values. For example, the thermoplastic sheet may have a thickness typically from 10 mils (254 μm) to 300 mils (7620 μm), preferably from 60 mils (1524 μm) to 250 mils (6350 μm), and more preferably from 100 mils (2540 μm) to 200 mils (5080 μm).

The thermoplastic sheet may optionally include additives, selected from, for example: light stabilizers, UV stabilizers, thermal stabilizers, antioxidants, fillers, pigments, dyes, waxes and combinations thereof. Such additives are typically present in amounts of less than 20 percent by weight, for example from 0.01 to 15 percent by weight, or 0.1 to 5 or 10 percent by weight, the percent weights being based on the weight of the thermoplastic sheet.

The support provided in the method of the present invention has a plurality of perforations having edges. The perforations may have a wide range of sizes and shapes (e.g., round, elliptical, and polygonal, such as square, rectangular, pentagonal and hexagonal). The perforations are sized such that a portion of the thermoplastic sheet can be drawn therethrough to form an attachment head on the second surface side of the support and embed the edges of the perforations therein. For purposes of illustration, a round perforation typically has a diameter of from 5 mm to 15 mm, preferably from 7 mm to 10 mm.

To assist in drawing the second surface of the thermoplastic sheet into abutting contact with the first surface of the support, the support may optionally include a plurality of vacuum holes. The vacuum holes are typically smaller than the perforations, and are sized to minimize drawing of the thermoplastic sheet therein, while at the same time allowing air to be drawn therethrough. More particularly, the optional vacuum holes are sized such that drawing of the thermoplastic sheet therethrough is minimized and preferably prevented. The vacuum holes may have any configuration (e.g., round, elliptical or polygonal), preferably the vacuum holes are substantially round. For purposes of illustration, round vacuum holes typically have a diameter of from 0.25 mm to 1.0 mm, preferably from 0.38 mm to 0.76 mm. In an embodiment of the present invention, the support is fabricated from sintered porous aluminum.

The support may have a substantially flat and/or three-dimensional shape. Typically, the support is a rigid support (i.e., it is more rigid than the thermoplastic sheet when heated above its softening point, and is in effect self supporting). Materials from which the support may be fabricated include, but are not limited to, metals, thermoset plastic materials, thermoplastic materials, and combinations thereof.

Thermoplastic materials from which the support may be fabricated include, but are not limited to, thermoplastic polyurethane, thermoplastic polyurea, thermoplastic polyimide, thermoplastic polyamide, thermoplastic polyamide-imide, thermoplastic polyester, thermoplastic polycarbonate, thermoplastic polysulfone, thermoplastic polyketone, thermoplastic polyethylene, thermoplastic polypropylene, thermoplastic acrylonitrile-butadiene-styrene, thermoplastic polyvinylchlorine and mixtures or thermoplastic compositions containing one or more thereof. Of the thermoplastic materials from which the support may be fabricated, thermoplastic polyamides are preferred, e.g., DURETHAN thermoplastic polyamide, commercially available from Bayer Polymers LLC.

As used herein and in the claims the term "thermoset plastic material" means plastic materials having a three dimensional crosslinked network resulting from the formation of covalent bonds between chemically reactive groups, e.g., active hydrogen groups and free isocyanate groups. Thermoset plastic materials from which the support may be fabricated include those known to the skilled artisan, e.g., crosslinked polyurethanes, crosslinked polyepoxides and crosslinked polyesters. Of the thermoset plastic materials, crosslinked polyurethanes are preferred. The support may be fabricated from crosslinked polyurethanes by the art-recognized process of reaction injection molding. Reaction injection molding typically involves, as is known to the skilled artisan, injecting separately, and preferably simultaneously, into a mold: (i) an active hydrogen functional component (e.g., a polyol and/or polyamine); and (ii) an isocyanate functional component (e.g., a diisocyanate such as toluene diisocyanate, and/or dimers and trimers of a diisocyanate such as toluene diisocyanate). The filled mold may optionally be heated to ensure and/or hasten complete reaction of the injected components. Upon complete reaction of the injected components, the mold is opened and the molded article, e.g., the support used in the present invention, is removed.

The thermoset plastic materials and/or thermoplastic materials from which the support may be fabricated, may optionally be reinforced with a material selected from glass fibers, carbon fibers, boron fibers, metal flakes, polyamide fibers (e.g., KEVLAR polyamide fibers) and mixtures thereof. The reinforcing materials, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcement material, e.g., glass fibers, is typically present in the thermoset plastic materials and/or thermoplastic materials of the support in a reinforcing amount, e.g., in an amount of from 5 percent by weight to 60 percent by weight, based on the total weight of the support.

Metals from which the support may be fabricated include, but are not limited to, aluminum and steel. In a preferred embodiment of the present invention, the support is fabricated from metal, e.g., steel.

In the method of the present invention, the thermoplastic sheet is heated to a temperature that is above the softening point, but less than the melting point of the sheet. More particularly, the thermoplastic sheet is heated to temperature at which it is formable and/or malleable. Generally, the thermoplastic sheet is heated to a temperature that is equal to or greater than its glass transition temperature (Tg). For purposes of illustration, when the thermoplastic sheet comprises a thermoplastic semicrystalline polyamide, the temperature to which the thermoplastic sheet is heated is typically from 230° C. to 250° C., and more typically from 235° C. to 245° C. The thermoplastic sheet may be heated by means of: convection (e.g., in a convection oven); contact with a heated surface, such as a heated roll; infrared heating (e.g., by means of quartz infrared heaters); and a combination of such heating methods.

At least a portion of the second surface of the heated thermoplastic sheet (i.e., the surface of the sheet that faces the first surface of the support) is then brought into contact with at least a portion of the first surface of the support. This can be achieved by art recognized means, that include for example holding terminal portions of heated thermoplastic sheet within clamps and: (i) bringing the sheet down onto the support; and/or (ii) bringing the support up into the sheet. The heated thermoplastic sheet and the support are typically brought into contact with each other within a vacuum mold.

With at least a portion of the second surface of the heated thermoplastic sheet in contact with at least a portion of the first surface of the support, reduced gaseous pressure is formed on the second surface side of the support. The reduced gaseous pressure serves to draw portions of the heated thermoplastic sheet through at least some of the perforations of the support. The edges of the perforations are embedded in the thermoplastic material drawn therethrough. As used herein and in the claims the term "embedded" and similar terms with regard to the edges of the perforations means that the perforation edges are substantially and irreversibly encased in the thermoplastic material extending therethrough.

At least one thermoplastic attachment head is formed on the second surface side of the support. The attachment head is formed from and is continuous with the thermoplastic material of the sheet that is drawn through the perforations. The thermoplastic material drawn through the perforations may be allowed to expand or mushroom out over a portion of the second surface of the support, thus forming the attachment heads. More typically, the thermoplastic material drawn through the perforations onto the second surface side of the support comes into contact with interior portions of the vacuum mold, which may be for example concave or flat, and which serve to shape the attachment head.

In an embodiment of the present invention, the attachment heads are formed by means of a reversibly retractable opposing mold member (e.g., a reversibly retractable core pin) being brought into contact with the thermoplastic material drawn through the perforations onto the second surface side of the support. With reference to FIG. 1 of the drawings, a reversibly retractable core pin 32 is shown as it is pulled away from the second surface 23 of support 20. Retractable core pin 32 has an attachment head shaping surface 35 that when brought into contact with the thermoplastic material of sheet 11 (that is drawn through perforation 47 of support 20), shapes and forms thermoplastic attachment head 29. More particularly, the shaping surface 35 of core pin 32 provides attachment head 29 with a shaped surface 38. Attachment head 29 is continuous with the thermoplastic material of sheet 11 that is drawn through perforation 47.

After formation of the attachment heads, the heated thermoplastic sheet is cooled below its softening point. With further reference to FIG. 1, the combination of: (i) the edges 44 of perforation 47 being embedded in the thermoplastic material of sheet 11 drawn therethrough; and (ii) attachment head 29 being continuous with the thermoplastic material of sheet 11, together serve to fixedly (and irreversibly) attach sheet 11 and support 20 one to the other. After cooling, first surface 14 of sheet 11, surface 38 of attachment head 29, and/or second surface 23 of support 20 may optionally be further processed, e.g., ground and/or buffed.

In an embodiment of the present invention at least a portion of the second surface of a second thermoplastic sheet is adhered to at least a portion of the first surface of the first thermoplastic sheet (i.e., the sheet that is first brought into contact with the first surface of the support and drawn through the perforations thereof). The second thermoplastic sheet may be fabricated from thermoplastic polymers as described previously herein with regard to the first thermoplastic sheet, including thermoplastic semicrystalline polymers.

The second thermoplastic sheet may be a single layer or multilayer sheet, as described previously herein with regard to the first thermoplastic sheet. In addition, the second thermoplastic sheet is meant to be inclusive of both sheets (e.g., having thicknesses of at least 30 mils (762 μm)), and films (e.g., having thicknesses of less than 30 mils (762 μm)). The second thermoplastic sheet may have a thickness selected from those values as recited previously herein with regard to the first thermoplastic sheet.

The second thermoplastic sheet may be adhered to the first thermoplastic sheet at any point during the process of the present invention, or thereafter. In an embodiment of the present invention the second thermoplastic sheet is adhered to the first thermoplastic sheet after step (e), for example between steps (e) and (f) or between steps (f) and (g).

The second thermoplastic sheet may be used for purposes of providing the article with a cosmetic surface and/or improved structural stability. Typically, when portions of the first thermoplastic sheet are drawn through the perforations of the support, a small dimple or depression may be left in the first surface of the first thermoplastic sheet (e.g., dimple 41 in FIGS. 1 and 2). The dimple or depression is usually aligned with the perforation. The application of a second thermoplastic sheet over the first surface of the first sheet serves to cover the dimples in the first sheet.

The second thermoplastic sheet may be adhered to the first sheet by means of adhesives, fasteners, heat fusion and combinations thereof. In an embodiment of the present invention, the second thermoplastic sheet is heated to a temperature that is equal to or greater than the softening point (e.g., at or above the Tg of the second sheet) and less than the melting point of the second sheet. At least a portion of the second surface of the heated second sheet is then brought into contact with at least a portion of the first surface of the first sheet. Preferably, the first sheet is also heated to a temperature greater than or equal to its softening point when the second sheet is brought into contact therewith. The two sheets in such contact are thus fused one to the other. Optionally, pressure may be applied (e.g., by means of a roller, such as a heated roller) to the first surface of the second sheet and/or to the second surface of the support to assist in fusing the two sheets together. The application of such pressure can also serve to press thermoplastic material of the second sheet into the dimples in the first surface of the first sheet.

In an embodiment of the present invention, the first thermoplastic sheet may be further fixedly attached to the support by attachment means selected from fasteners, adhesives and combinations thereof. Adhesives that may be used include those known to the skilled artisan, such as polyurethane adhesives and epoxy based adhesives. Art recognized heat activated adhesives may also be used. If an adhesive is used, it is typically applied to at least a portion of the first surface of the support (e.g., by means of a doctor blade) prior to bringing the thermoplastic sheet into contact with the support. Fasteners that may be used include, for example, self tapping screws, nuts and bolts, and rivets.

The perforations of the support may have deformed edge portions, in an embodiment of the present invention. The deformed edge portions of the perforations are embedded in the thermoplastic material of the sheet drawn or extending therethrough. Deformed edge portions can be formed by know methods, which include for example, bending and/or crimping the edges of the perforations. Deformed edge portions may be employed for purposes of improving the fixed attachment of the first sheet to the support, because the deformed edge portions may be more firmly embedded in the thermoplastic material of the first sheet extending through the perforation.

The present invention is also directed to an article of manufacture. With reference to the drawing figures, a sectional view of an article of manufacture 2 according to the present invention is depicted in FIG. 1. The compositions, dimensions and methods of fabrication of the various elements of the articles of manufacture depicted in the drawing figures, are as described previously herein with regard to the method of the present invention.

Article 2 of FIG. 1 includes a support 20 having a first surface 26 and a second surface 23, and a plurality of perforations 47 having edges 44. Article 2 also includes a thermoplastic sheet 11 having a first surface 14 and a second surface 17. At least a portion of second surface 17 of sheet 11 is in abutting contact with at least a portion of first surface 26 of support 11. A portion of sheet 11 extends through perforation 47, and is continuous with attachment head 29 (having an exterior surface 38) on the second surface side 23 of support 11. Edges 44 of perforation 47 are embedded in the thermoplastic material extending through perforation 47. Sheet 11 and support 20 are fixedly attached one to the other by means of: (i) edges 44 of perforation 47 being embedded in the thermoplastic material of sheet 11 extending therethrough; and (ii) attachment head 29 on second surface side 23 of support 20 being continuous with the thermoplastic material extending through perforation 47.

First surface 14 of sheet 11 of article 2 also includes a dimple or depression 41 that is substantially aligned with perforation 47. As discussed previously herein, dimple 41 is formed as the result of a portion of sheet 11 being drawn through perforation 47 to form attachment head 29. Dimple 41 may optionally be filled in with a filler material, e.g., additional thermoplastic material, (not shown), or, if it is not too deep, smoothed out by means of a heated iron or roller (e.g., having a textured surface) being pressed there-against. Alternatively, dimple 41 may be covered up by means of superposing a second thermoplastic sheet over first sheet 11.

Figure 2:
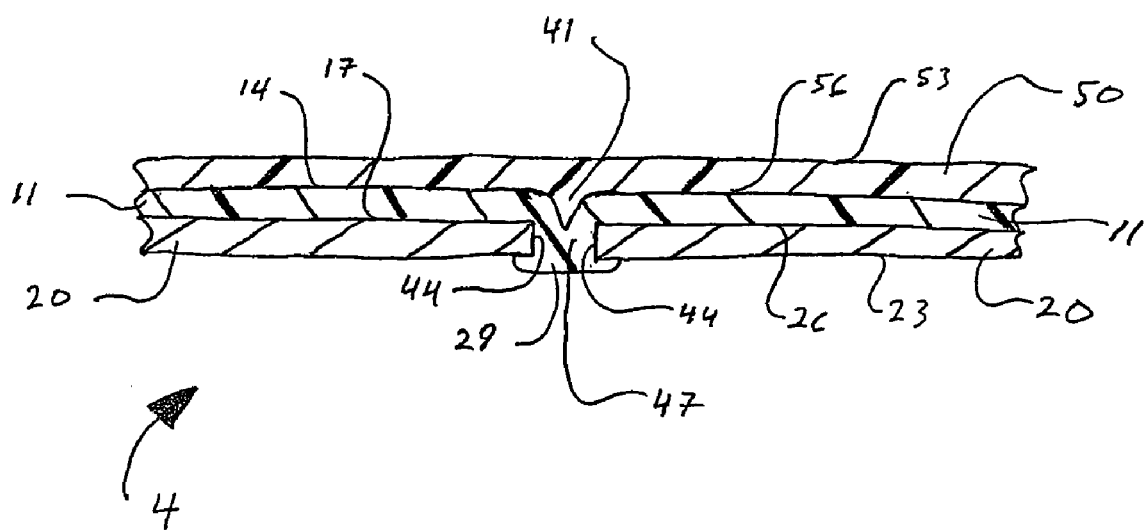
FIG. 2 is a representative sectional view of an article prepared by the process of the present invention which further includes a second thermoplastic sheet.

A further embodiment of an article of manufacture 4 according to the present invention, that includes a second thermoplastic sheet 50, is depicted in FIG. 2. Second thermoplastic sheet 50 has a first surface 53 and a second surface 56. Second surface 56 of second sheet 50 abuts and is adhered to first surface 14 of first sheet 11. As discussed previously herein, second sheet 50 may be adhered to first sheet 11 by means of adhesives, fasteners, heat fusion, and combinations thereof. With the application of pressure and heat to first surface 53 of second sheet 50, dimple 41 can be at least partially filled with the thermoplastic material of second sheet 50. Alternatively, dimple 41 may be filled with filler material (e.g., additional thermoplastic material and/or adhesive) prior to adhering second sheet 50 to first sheet 11.

Figure 3:
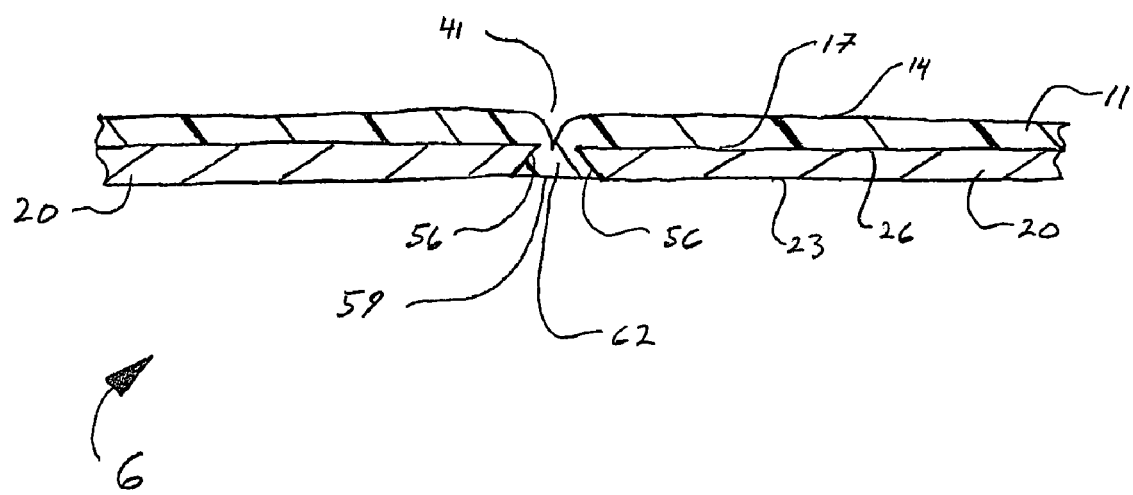
FIG. 3 is a representative sectional view of an article prepared by the process of the present invention in which the perforations of the substrate have deformed edge portions.

An article of manufacture 6 according to the present invention that includes deformed edge portions is depicted in FIG. 3 of the drawings. Support 20 has a perforation 62, which is defined by deformed edge portions 56. Deformed edge portions 56 are beveled or chamfered, and are embedded in the thermoplastic material of sheet 11 that extends through perforation 62. The thermoplastic material extending through perforation 62 forms attachment head 59, which is on the second surface side of support 20, and is substantially flush with second surface 23 of support 20. Sheet 11 and support 20 are fixedly attached together by means of deformed edge portions 56 being embedded in the thermoplastic material of sheet 11 extending through perforation 62, and by means of attachment head 59.

Figure 6:
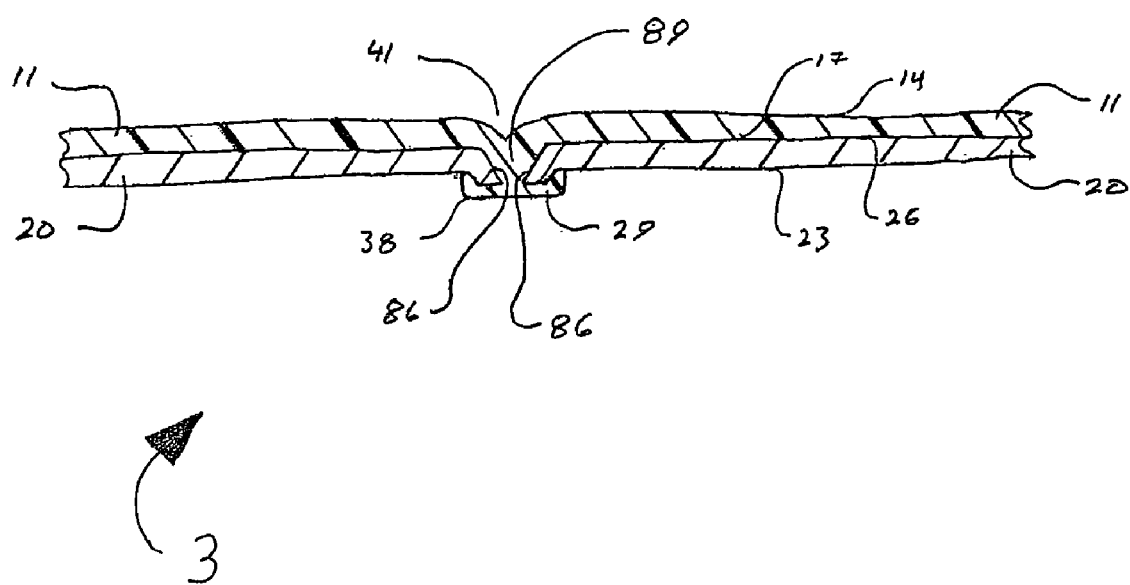
FIG. 6 is a representative sectional view of an article prepared by the process of the present invention in which the perforations of the substrate have deformed edge portions.

A further article of manufacture 3 according to the present invention which includes deformed edge portions is depicted in FIG. 6 of the drawings. Support 20 has a perforation 89, which is defined by deformed edge portions 86. Deformed edge portions 86 extend out from second surface 23 of support 20, and may be formed, for example, by means of the art recognized method of mechanically punching perforations through first surface 26 through to second surface 23 of support 20. The thermoplastic material extending through perforation 89 embeds deformed edge portions 86 therein, and forms attachment head 29, which is on the second surface side of support 20. Sheet 11 and support 20 are fixedly attached together one to the other by means of deformed edge portions 86 being embedded in the thermoplastic material of sheet 11 extending through perforation 89, and by means of attachment head 29.

Figure 4:
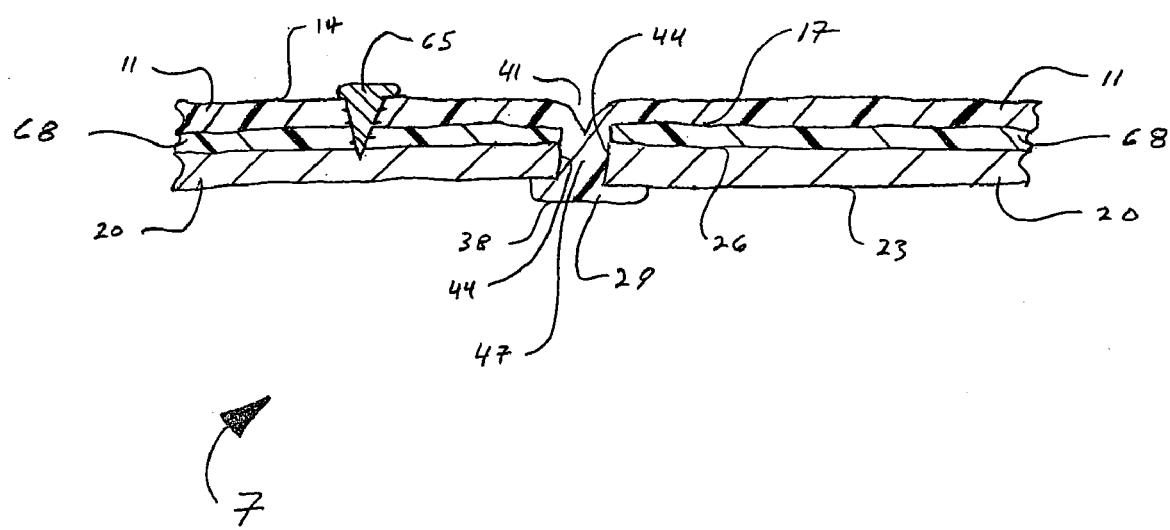
FIG. 4 is a representative sectional view of an article prepared by the process of the present invention which includes an adhesive layer and a fastener as further attachment means.

In addition to the combination of the thermoplastic embedded perforation edges and thermoplastic attachment heads, the sheet and support may be further fixedly attached to each other by attachment means selected from adhesives and/or fasteners, as discussed previously herein. Article of manufacture 7 of FIG. 4 includes a fastener 65 which is screwed through first surface 14 of sheet 11, and extends through adhesive layer 68 and into support 20. Adhesive layer 68 of article 7 is abutingly interposed between second surface 17 of sheet 11 and first surface 26 of support 20. Adhesive layer 68 may be selected from art recognized adhesives, as discussed previously herein.

Figure 7:
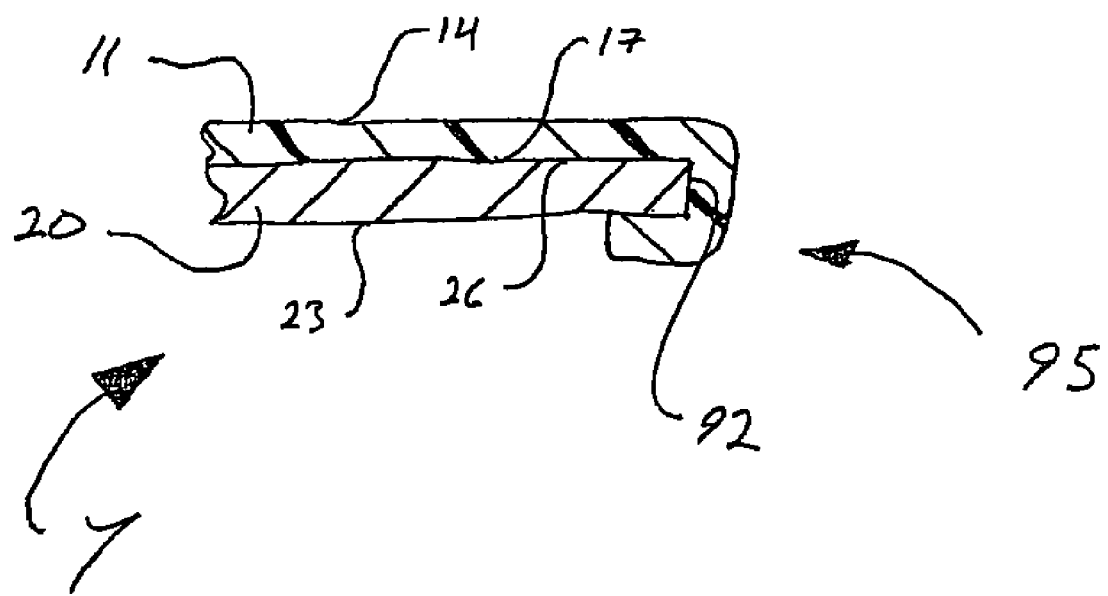
FIG. 7 is a representative sectional view of an article prepared by the process of the present invention in which the thermoplastic sheet and the support are further fixedly attached one to the other by means of portions of the sheet wrapping around and embedding terminal edge portions of the support.

In an embodiment of the present invention, the thermoplastic sheet and the support may (in addition to the combination of the thermoplastic embedded perforation edges and thermoplastic attachment heads, and optional adhesives and/or fasteners) be further fixedly and irreversibly attached one to the other by means of portions of the thermoplastic sheet wrapping around and embedding at least a portion of the terminal edges of the support therein. As used herein and in the claims, the term "terminal edges" with regard to the support refers to those edges of the support that do not define perforations, and are located at the terminal portions of the support. With reference to FIG. 7, a portion of an article of manufacture 1 according to the present invention is depicted which includes a wrap-around attachment means (or element) 95. Support 20 has a terminal edge portion 92, which is embedded in the thermoplastic material of sheet 20 that is wrapped there-around. Second surface 17 of sheet 11 abuts first surface 26 of support 20, wraps around terminal edge portion 95 and abuts a portion of second surface 23 of support 20. Terminal edge portions 92 of sheet 20 may be as depicted in FIG. 7 (e.g., substantially non-deformed), or they may optionally be deformed (e.g., bent, crimped and/or chamfered/beveled) (not shown).

Wrap-around attachment element 95 may be formed prior to, concurrently with or subsequent to drawing portions of sheet 11 through the perforations in support 20 (e.g., perforations 47, 62 and/or 89). Wrap-around attachment element 95 may be formed by art-recognized molding methods. In one embodiment, excess sheet 11 extends beyond terminal edge portion 92, and is wrapped around terminal edge portion 92 by means of a separate mold member (not shown) and held in place until cooled below the softening point of sheet 11.

Figure 5:
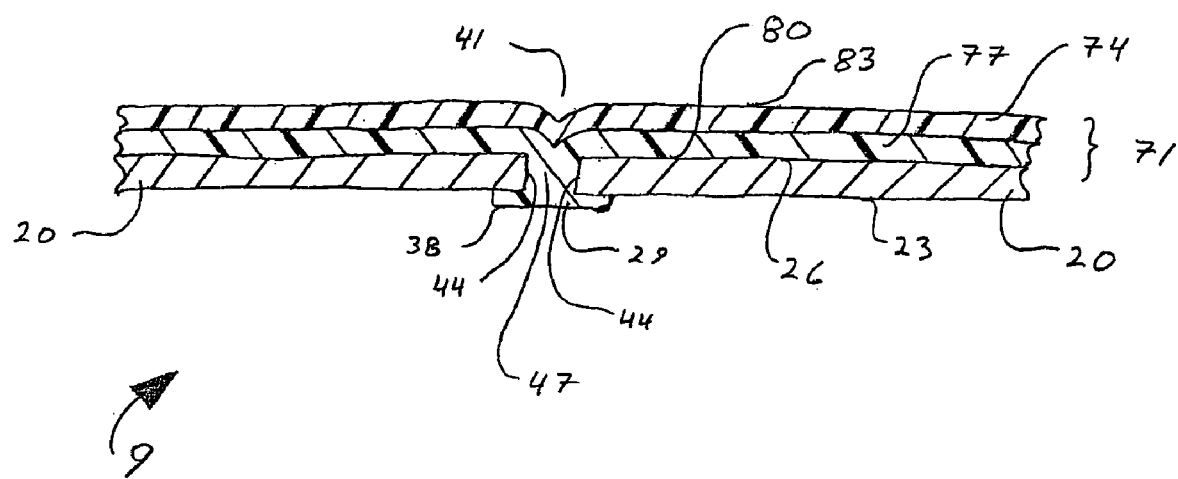
FIG. 5 is a representative sectional view of an article prepared by the process of the present invention in which the sheet is a multilayer sheet.

Article of manufacture 9 depicted in FIG. 5 includes a first multilayer sheet 71 having two layers 74 and 77. Layer 74 is superposed over layer 77, and both layers together extend through perforation 47 to form attachment head 29. In addition, edges 44 of perforation 47 are embedded in the thermoplastic material of first multilayer sheet 71 extending therethrough. First surface 83 of first multilayer sheet 71 has a dimple 41 therein that is substantially aligned with perforation 47. At least a portion of second surface 80 of first multilayer sheet 71 abuts at least a portion of first surface 26 of support 20.

Articles of manufacture according to and that may be prepared in accordance with the process of the present invention include, but are not limited to: interior and exterior automotive body panels and components (e.g., the dash board and components thereof); interior and exterior aircraft body panels and components (e.g., cockpit instrument displays and components thereof); interior and exterior architectural building panels; office divider panels, such as those used in the construction of cubicles; and panels used in the construction of truck trailers and recreational vehicles.

The present invention has been described with reference to specific details of particular embodiments thereof. It is not intended that such details be regarded as limitations upon the scope of the invention except insofar as and to the extent that they are include in the accompanying claims.

What is claimed is:
1. A method of preparing an article comprising:
(a) providing a thermoplastic sheet having a first surface and a second surface;
(b) providing a support having a plurality of perforations having edges, a first surface and a second surface;
(c) heating said thermoplastic sheet to a temperature that is at least equal to the softening point and less than the melting point of said thermoplastic sheet;
(d) bringing at least a portion of the second surface of the heated thermoplastic sheet into contact with at least a portion of the first surface of said support;
(e) forming reduced gaseous pressure on the second surface of said support, thereby drawing portions of said heated thermoplastic sheet through at least some of said perforations, the edges of said perforations being embedded in the thermoplastic material drawn therethrough;
(f) forming at least one thermoplastic attachment head on the second surface side of said support, said thermoplastic attachment head being formed from and being continuous with the portions of said thermoplastic sheet that are drawn through said perforations; and (g) cooling the heated thermoplastic sheet below its softening point, wherein said thermoplastic sheet is fixedly attached to said support by means of said attachment heads and the edges of said perforations being embedded in the thermoplastic material drawn therethrough.

2. The method of claim 1 wherein said support is fabricated from a material selected from the group consisting of metal, thermoset plastic material, thermoplastic material and combinations thereof.

3. The method of claim 1 wherein said thermoplastic sheet is selected from single layer thermoplastic sheets and multilayer thermoplastic sheets.

4. The method of claim 1 wherein said thermoplastic sheet comprises at least one material selected from thermoplastic polycarbonate, thermoplastic polyester, thermoplastic polyamide, thermoplastic graft copolynier, thermoplastic vinyl polymer, thermoplastic polyolefin, thermoplastic poly (meth)acrylate and thermoplastic polyurethane.

5. The method of claim 1 wherein said thermoplastic sheet comprises at least one thermoplastic semicrystalline polymer.

6. The method of claim 5 wherein said thermoplastic semicrystalline polymer is selected from thermoplastic semicrystalline polyester, thermoplastic semicrystalline polyamide and combinations thereof.

7. The process of claim 1 wherein said thermoplastic sheet is further fixedly attached to said support by attachment means selected from fasteners, adhesives and combinations thereof.

8. The process of claim 1 wherein said perforations have deformed edge portions, and said deformed edge portions are embedded in the thermoplastic material drawn therethrough.

* * * * *